June 18, 1957 R. N. LUMBERT 2,796,506
REAR-VIEW MIRROR FOR MOTOR VEHICLES
Filed Sept. 2, 1954

INVENTOR
Ray N. Lumbert

BY W. N. Rambo
ATTORNEY

United States Patent Office 2,796,506
Patented June 18, 1957

2,796,506
REAR-VIEW MIRROR FOR MOTOR VEHICLES
Ray N. Lumbert, Columbus, Ohio
Application September 2, 1954, Serial No. 453,725
3 Claims. (Cl. 219—19)

This invention relates to vehicle mounted mirrors and, more particularly to rear-view mirrors of the type adapted for mounting in an exterior or exposed position adjacent to one side of a motor vehicle for the purpose of enabling an operator to ascertain traffic conditions prevailing on a highway to the rear and, also, to the left of the operator's vehicle.

In the operation of motor trucks and busses, particularly, the operators thereof rely largely, in ascertaining the maneuvering and positions of following vehicles, upon vision obtained through side placed, exteriorly disposed, rear-view mirrors. This is attributable in large part to the fact that interiorly mounted rear-view mirrors are not practicable and because of vision-obstructing conditions presented by trailing associated vehicles connected with a forward propelling or tractor vehicle. In periods of inclement weather, however, moisture accumulations on the exposed surfaces of such rear-view mirrors often beclouds the same so that their usefulness is seriously impaired, so that an operator of such a vehicle is often deprived of an important adjunct in safe motor vehicle operation.

Accordingly, it is a leading object of the present invention to provide a rear-view mirror adapted for mounting in a weather-exposed location on a motor vehicle, and wherein the mirror proper is arranged in a recessed opening formed in the back of supporting metallic casing for the mirror, and wherein the walls of the casing around the mirror are formed with a plurality of air ports or openings so disposed as to direct, when the vehicle carrying the mirror is in forward motion, jets of relatively dry air across the outer or viewable face of the mirror and in a manner preventing moisture droplets from beclouding the mirror and interfering with the operator's functional use thereof.

Another object is to provide a non-clouding rear-view mirror embodying an outer metallic casing formed for the reception of a rearwardly placed mirror, and wherein the casing is formed interiorly thereof, and to the front of the mirror, with an air-circulating chamber, said chamber being open to the atmosphere at the front of the casing in a manner providing for a forced and positive flow of air into the chamber when the vehicle on which the mirror is mounted is moving forwardly, the rear of said chamber around the peripheral edges of the walls thereof defining the upper half of the mirror being provided with a plurality of spaced parts so formed in the marginal edges of the opening or recess of the casing in which the mirror is positioned as to direct jets of air inwardly and downwardly over the exposed face of the mirror and to thereby keep the latter free from vision-obscuring moisture deposits.

A further object is to provide a non-clouding rear-view mirror of the character set forth, wherein the air chamber, provided in the casing of the mirror at the front of the latter, is formed to include a vented moisture trap, so that water particles, entrained in air forced or drawn in the air chamber, may be trapped and diverted from the appliance in a manner precluding the same from mirror engagement.

A still further object of the invention is to provide a rear-view mirror of the character stated and one wherein provision is made for electrically heating, deicing and drying the air to deprive the same largely of its moisture content during passage of the air through the air-circulating chamber of the mirror casing and prior to the passage of the relatively dry air over the mirror surfaces.

It is still another object of the invention to provide a simple, inexpensive and efficient rear-view mirror for motor vehicle use, and one which constitutes an improvement generally on mirror devices of this general category.

For a further understanding of the invention, reference is to be had to the following description and accompanying drawings, wherein.

Figure 1:
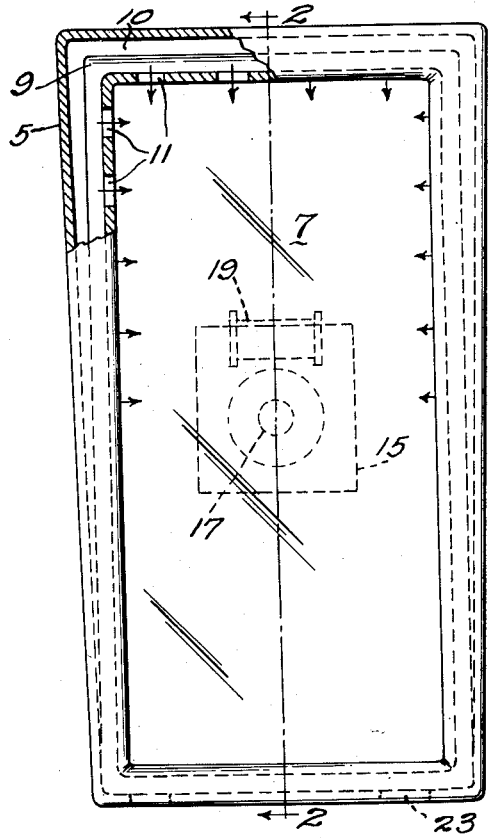
Fig. 1 is a front elevational view of a rear-view mirror formed in accordance with the present invention.

Referring to the several figures of the drawing by reference characters, my improved rear-view mirror construction includes an outer casing 5 of sheet metal or the like. In the form of my invention illustrated in Figs. 1 to 3, the casing is generally of rectangular configuration, or, as shown in Fig. 4, the casing 5a may possess a circular form.

Figure 2:
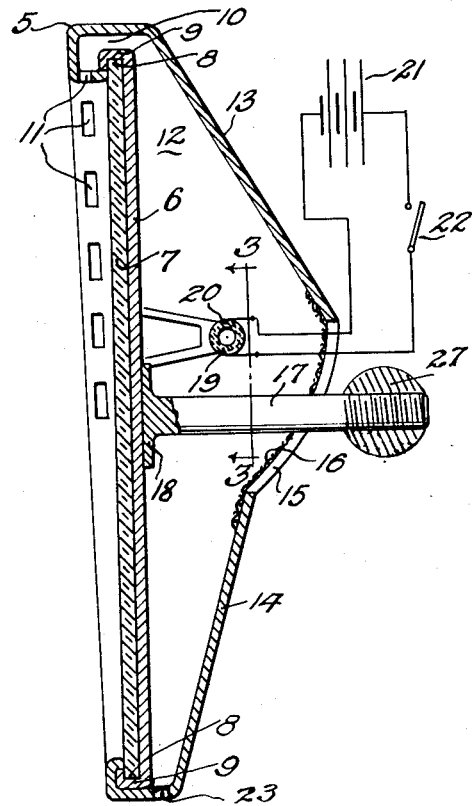
Fig. 2 is a vertical longitudinal sectional view taken through the mirror on the plane indicated by the line 2—2 of Fig. 1.

The casing 5 is here shown as comprising a rectangular vertical rear wall 6 against the outer face of which is placed the silvered reflecting surface of a rectangular mirror plate 7 of glass, or the like. The plate is held in position by having its marginal edges received in communicating channels 8 formed in a rectangular web 9 of the casing, said web defining the boundaries of a recess 10 in the back of the casing in which the mirror plate is disposed. It will be noted that the recess is substantially deeper longitudinally at the top thereof than at its bottom, the inward depth of the recess tapering progressively in a diminishing manner from the top of the casing to the bottom thereof, as shown in Fig. 2.

In front of the mirror plate 7, the upper half of the web 10 of the casing has the vertical sides and horizontal upper walls thereof formed with a plurality of spaced air outlet openings 11 which communicate with an air-circulating chamber 12 formed in the casing around the upper half of the web 10 and in front of the rear wall 6. The front of the chamber 12 is defined by inclined upper and lower front walls 13 and 14, the front wall having the greater inclination and, as shown in Fig. 2, terminates in overhanging, forwardly offset relationship with respect to the upper edge of the lower wall 14, whereby to define a forwardly disposed air inlet opening 15 for the chamber 12 which is covered by a fine wire mesh screen 16.

Extending axially through the opening 15 and screen 16 is the shank of a mounting bolt 17, the forward threaded end of the bolt being terminated in advance of the casing for reception in a suitable vehicle-carried support, not shown. The rear end of the bolt shank is provided with an enlarged head 18 welded or otherwise fastened to the rear wall 6 axially thereof. The wall 6 may, also, carry an electrically energized heating resistor 19 which is arranged in the chamber 12 in the path of air flow entering the chamber through the opening 15 thereof. The conductor wires 20 of the resistor are adapted to receive current from a vehicle storage battery unit 21 having a control switch 22.

In the operation of the mirror, the same is adapted to be mounted in the usual stationary manner, as by the bolt 17, on an associated motor vehicle, not shown, or in any other manner customary with appliances of this kind. As the motor vehicle moves forwardly, air is caused to forcibly enter the chamber 12, in this instance through the screened inlet opening 15 thereof. As a result of such forward vehicle movement or negative pressures developed in the mirror recess 10 of the casing, air entering the chamber 12 is withdrawn therefrom through the web openings 11 and positively advanced across the exposed face of the mirror plate 7. By so doing, moisture droplets, caused by rain, fog or the like, are removed from the exposed surface of the mirror plate 7 as rapidly as deposited, so that the plate is maintained at all times in a clear, unclouded and light-reflecting state.

Moisture contained in the air entering the chamber 12 through the opening 15 is largely dissipated by the action of the heating coil 19 and a moisture trap before the air reaches the mirror plate. The moisture-trap is formed in the bottom of the chamber 12 between the casing walls 6 and 14, the bottom of the trap being formed with a water-discharging slot or opening 23.

Figure 3:
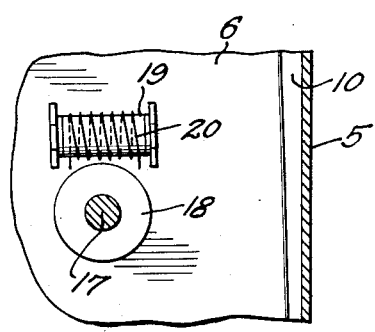
Fig. 3 is a vertical sectional view taken on the line 3—3 of Fig. 2.
Figure 4:
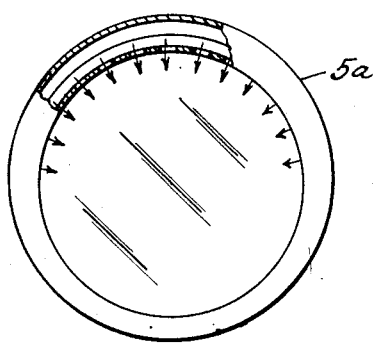
Fig. 4 is a rear elevational view, partly in vertical section, of a modified form of my improved mirror.

The construction and operation of the mirror shown in Fig. 4 is the same in all material respects to that of Figs. 1 to 3, the principal difference residing in the circular configuration of the mirror of Fig. 4 as contrasted with the rectangular form of the preferred type.

Figure 5:
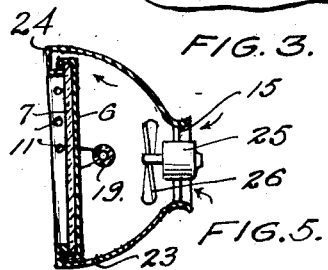
Fig. 5 is a sectional view showing a further modified form of my improved rear view mirror.

In the form of my invention disclosed in Fig. 5, the mirror has its casing shown at 24 provided with an air inlet in the front thereof. In this inlet there may be mounted a small electric motor 25 which drives a fan or blower 26 in order that a positive flow of air may be effected across the viewing surface of the mirror. Such a motor-driven fan is advantageous when the vehicle on which the mirror is mounted is moving forwardly at a low rate of speed, or when standing still.

The bolt 17 may have its threaded outer end equipped with a ball device 27 for mounting the mirror in the correspondingly formed socket of a mounting bracket, not shown, for universal adjustment, or the bolt may be stationarily secured to a fixed support.

I claim:
1. A rear view mirror for use in exposed locations on motor vehicles, comprising a mirror housing formed with an inwardly recessed rear wall and a forwardly projecting front wall defining with said rear wall and within said housing an internal air chamber, said front wall being formed substantially centrally thereof with an air inlet opening forwardly of said housing and communicating with said internal chamber; a reflective mirror plate stationarily positioned and secured in said housing adjacent said rear wall, said housing being formed about the rear wall thereof with a rearwardly and outwardly projecting web defining with said front wall a marginal air passage communicating with said internal chamber, said web being formed with a plurality of air outlet openings adjacent the marginal edges of said mirror plate for directing air entering said air chamber by way of said inlet outwardly from said chamber across the face of said mirror plate to remove therefrom beclouding deposits of moisture.

2. A rear view mirror as defined in claim 1, and wherein said housing is formed at the bottom of said internal chamber with a vent opening through which moisture present in said chamber may pass gravitationally therefrom.

3. A rear view mirror as defined in claim 1, and wherein an electrically energized heating element is mounted within the internal chamber of said housing between said inlet and said outlet openings for heating air passing through said chamber prior to its discharge across the face of said mirror plate.

References Cited in the file of this patent

UNITED STATES PATENTS

| | | |
|---|---|---|
| 1,783,270 | Askam | Dec. 2, 1930 |
| 1,790,419 | Heinemann et al. | Jan. 27, 1931 |
| 1,894,205 | Stollsteimer | Jan. 10, 1933 |
| 2,326,316 | Allen | Aug. 10, 1943 |
| 2,565,256 | Myers et al. | Aug. 21, 1951 |
| 2,585,273 | Prutzman | Feb. 12, 1952 |
| 2,693,589 | Hopkins | Nov. 2, 1954 |